United States Patent
Cahill et al.

(10) Patent No.: US 10,476,979 B2
(45) Date of Patent: Nov. 12, 2019

(54) MULTIMEDIA MESSAGING SERVICE GATEWAY (MMSGW) SYSTEM, METHOD OF OPERATING A MULTIMEDIA MESSAGING SERVICE GATEWAY (MMSGW) SYSTEM AND A SOFTWARE PRODUCT

(71) Applicant: Webtext Holdings Limited, Dublin (IE)

(72) Inventors: Anthony Cahill, Galway (IE); Colm Keating, Dublin (IE)

(73) Assignee: WEBTEXT HOLDINGS LIMITED, Dublin (IE)

( * ) Notice: Subject to any disclaimer, the term of this patent is extended or adjusted under 35 U.S.C. 154(b) by 401 days.

(21) Appl. No.: 15/183,261

(22) Filed: Jun. 15, 2016

(65) Prior Publication Data
US 2016/0366237 A1    Dec. 15, 2016

Related U.S. Application Data

(60) Provisional application No. 62/180,024, filed on Jun. 15, 2015.

(51) Int. Cl.
| | |
|---|---|
| *H04L 29/08* | (2006.01) |
| *H04W 4/12* | (2009.01) |
| *H04L 12/58* | (2006.01) |
| *H04W 88/16* | (2009.01) |

(52) U.S. Cl.
CPC .......... *H04L 67/2804* (2013.01); *H04L 51/10* (2013.01); *H04L 51/38* (2013.01); *H04L 67/20* (2013.01); *H04L 67/2847* (2013.01); *H04W 4/12* (2013.01); *H04L 51/066* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 9,680,803 B2 * | 6/2017 | Moshir | H04L 63/0464 |
| 2005/0064883 A1 * | 3/2005 | Heck | H04L 29/06027 455/466 |
| 2005/0143136 A1 * | 6/2005 | Lev | H04L 29/06 455/566 |

(Continued)

OTHER PUBLICATIONS

International Search Report and Written Opinion, Application No. PCT/US2016/037592, dated Dec. 9, 2016, 11 pages.

*Primary Examiner* — Thomas J Dailey
(74) *Attorney, Agent, or Firm* — Pearne & Gordon LLP (57) ABSTRACT

A Multimedia Messaging Service Gateway (MMSGW) system for the reception of a content associated with a MMS message is described. The MMSGW includes an ingress for reception of a notification to the MMSGW of sending of the MMS message and for forwarding of the notification to an initial parser arranged to obtain metadata associated with the content for production of an IP object based on the notification. The MMSGW also includes a content retrieval for download of the content from the server according to the IP object, storage for one or more of the retrieved content or metadata associated with the retrieved content, an egress for transmitting a MMSGW process completion indicator, and an API for facilitating retrieval of one or more of the retrieved content or the metadata by a remote party.

28 Claims, 8 Drawing Sheets

(56) References Cited

U.S. PATENT DOCUMENTS

| | | | |
|---|---|---|---|
| 2005/0207379 A1* | 9/2005 | Shen | H04L 51/00 370/338 |
| 2006/0176902 A1* | 8/2006 | Bellordre | H04L 51/066 370/466 |
| 2007/0058681 A1 | 3/2007 | Bettis et al. | |
| 2007/0174401 A1* | 7/2007 | Chu | G06Q 10/107 709/206 |
| 2009/0030917 A1* | 1/2009 | Guo | H04L 51/38 |
| 2010/0088378 A1 | 4/2010 | Asawa et al. | |
| 2010/0167762 A1* | 7/2010 | Pandey | H04W 4/12 455/466 |
| 2011/0053618 A1* | 3/2011 | Lin | H04L 51/12 455/466 |
| 2011/0276645 A1* | 11/2011 | Andersson | H04L 51/12 709/206 |
| 2012/0079030 A1* | 3/2012 | Zhou | H04L 47/70 709/204 |

\* cited by examiner

MULTIMEDIA MESSAGING SERVICE GATEWAY (MMSGW) SYSTEM, METHOD OF OPERATING A MULTIMEDIA MESSAGING SERVICE GATEWAY (MMSGW) SYSTEM AND A SOFTWARE PRODUCT

FIELD

The present invention relates to the field of MMS messaging, in particular to the handling of content associated with an MMS message.

BACKGROUND

While systems and methods have been developed for the exchange of messages between different messaging systems, these are primarily concerned with messages containing text.

As remote & (and) mobile users become more sophisticated in their requirements, a need arises to handle more complex content, images, rich text, videos etc. To facilitate these forms of content between mobile users, the MMS (Multimedia Messaging Service) standard was developed, whereby a mobile user could send content such as a video, document or image, to other mobile users.

There is, therefore, a need to bring these forms of content into third party, mostly non-mobile, environments.

Problem Description

Many business applications/use cases exist where a key process relies on the receipt of media-rich content by a business or provider, from a customer or subscriber, such media being for example images/photos or videos. For example, one industry, where this is a common requirement, is the insurance industry, where a customer or agent of an insurance company needs to relay an image to the company when assessing damage or injury in relation to an ongoing or potential insurance claim. While the client end of this use case is sufficiently equipped for this transfer of data, with most people possessing a cellphone or similar device capable of producing and transmitting imagery, the consumer end of the scenario, in this example the insurance company, often has no means of receiving and viewing the imagery, or relies on arduous and cumbersome mechanisms, for example having a cell phone in the office which is used to receive the messages, then manually downloading these media files manually via a cable to an office computer, for filing and viewing by staff members.

BRIEF SUMMARY OF THE INVENTION

The MMS Gateway (MMSGW) is a system or collection of systems whose purpose is to receive and process incoming MMS messages from handsets, store content related to those messages, in a format or formats compatible with any of a number of consumer platforms, and to make available to said platforms a means of retrieving information about such content, and the content itself. The MMSGW also takes requests for outbound MMS messages from the client platforms, and converts or modifies the content destined for recipient handsets, into a format or formats compatible with said handsets and the carriers/operators of those handsets.

It is an objective of the present invention to facilitate easy transfer and access to content associated with an MMS message for at least one remote party, optionally in a desired format.

This objective is achieved by provision of a Multimedia Messaging Service Gateway (MMSGW) system, as outlined in appended claim 1, specifically by:

A Multimedia Messaging Service Gateway (MMSGW) system, for the reception of a content associated with a MMS message, the MMS message originating from a mobile device arranged in co-operation with a carrier comprising a server, the MMSGW comprising:
  an ingress, for reception of a notification to the MMSGW of sending of the MMS message and for forwarding of the notification to,
  an initial parser, arranged in co-operation with the server and arranged to obtain metadata associated with the content, for production of an IP object based on the notification,
  a content retrieval for download of the content from the server according to the IP object,
  a store for storage of the retrieved content and/or metadata associated with the retrieved content,
  an egress arranged to transmit a MMSGW process completion indicator,
  an API, arranged to facilitate retrieval of the retrieved content and/or metadata by at least one remote party.
  Optionally, the mobile device comprises one of: a handset; a mobile phone; a computer terminal.
  Optionally, the notification:
  originates from one of: the carrier, a third party or network, a third party service provider; and/or,
  comprises a protocol, said protocol optionally comprising HTTP, SMPP, MM4 or MM7; and/or,
  comprises a descriptive file describing the content, optionally in XML or JSON format; and/or,
  comprises an identifier, optionally arranged to facilitate obtaining a description of the content; and/or,
  comprises metadata associated with the content.
  Optionally, the content comprises at least one file, optionally an image, a video, or a sound file.
  Optionally, the initial parser further comprises a metadata retrieval and/or a metadata localization.
  Optionally, the store comprises a content store and/or a meta store, arranged internal or external to the MMSGW, and optionally implemented as a memory or a database or a plurality of memories or databases.
  Optionally, the ingress comprises a pre-fetch queue and/or the egress comprises a post-fetch queue.
  Optionally, the server comprises a plurality of servers.
  Optionally, the MMSGW further comprises a content processing, for post-retrieval processing of the content to produce a CP output, and arranged in co-operation with the content retrieval and the egress.
  Optionally, the content processing is further arranged in co-operation with the store for storage of the CP output from the content processing.
  Optionally, the CP output from the content processing is arranged to comprise at least one file associated with the content, said at least one file being optionally arranged in a desired format, and/or metadata associated with the at least one file.
  Optionally, the API is arranged to provide the at least one remote party with an API output, said API output optionally comprising JSON format, and/or optionally comprising at least one of: a number of parts of the message, a MIME type, a size and/or a file name of a message component.
  In another aspect of the present invention, there is provided a method of operating a Multimedia Messaging Service Gateway (MMSGW) system, as outlined in appended claim 13, specifically there is provided:

a method of operating a Multimedia Messaging Service Gateway (MMSGW) system, the MMSGW arranged for the reception of a content associated with a MMS message, the MMS message originating from a mobile device arranged in co-operation with a carrier comprising a server, the MMSGW comprising:

provide an ingress, for reception of a notification to the MMSGW of sending of the MMS message and for forwarding of the notification to an initial parser, providing the initial parser, arranged in co-operation with the server and arranged to obtain metadata associated with the content, for production of an IP object based on the notification, providing a content retrieval for download of the content from the server according to the IP object, providing a store for storage of the retrieved content and/or metadata associated with the retrieved content, providing an egress arranged to transmit a MMSGW process completion indicator, providing an API, arranged to facilitate retrieval of the retrieved content and/or metadata by at least one remote party.

Optionally, the method further comprises at least one of the further steps of:

arranging the mobile device to comprise one of: a handset; a mobile phone; a computer terminal;

arranging the notification to, originate from one of: the carrier, a third party or network, a third party service provider; and/or, comprise a protocol, said protocol optionally comprising HTTP, SMPP, MM4 or MM7; and/or, comprise a descriptive file describing the content, optionally in XML or JSON format; and/or, comprise an identifier, optionally arranged to facilitate obtaining a description of the content; and/or, comprise metadata associated with the content;

arranging the content to comprise at least one file, optionally an image, a video, or a sound file.

arranging the initial parser to further comprise a metadata retrieval and/or a metadata localization;

arranging the store to comprise a content store and/or a meta store, arranged internal or external to the MMSGW, and optionally implemented as a memory or a database or a plurality of memories or databases;

arranging the ingress to comprise a pre-fetch queue and/or the egress comprises a post-fetch queue;

arranging the server to comprise a plurality of servers.

Optionally, the method further comprises the step of:

arranging the MMSGW to further comprise a content processing, for post-retrieval processing of the content to produce a CP output, and arranged in co-operation with the content retrieval and the egress;

and, optionally, further comprises the step of:

arranging the content processing in co-operation with the store for storage of the CP output from the content processing;

and/or further comprises the step of, arranging the CP output from the content processing to comprise at least one file associated with the content, said at least one file being optionally arranged in a desired format, and/or metadata associated with the at least one file.

Optionally, the method further comprises the step of:

arranging the API to provide the at least one remote party with an API output, said API output optionally comprising JSON format, and/or optionally comprising at least one of: a number of parts of the message, a MIME type, a size and/or a file name of a message component.

In another aspect of the present invention, there is provided a software product, as claimed in appended claim 17, the software product being recorded on machine readable data storage media, characterized in that said software product is executable upon computing hardware for implementing a method according to embodiments of the present invention.

BRIEF DESCRIPTION OF THE DRAWINGS

The invention will now be further elucidated by reference to the figures.

DETAILED DESCRIPTION

Figure 1:
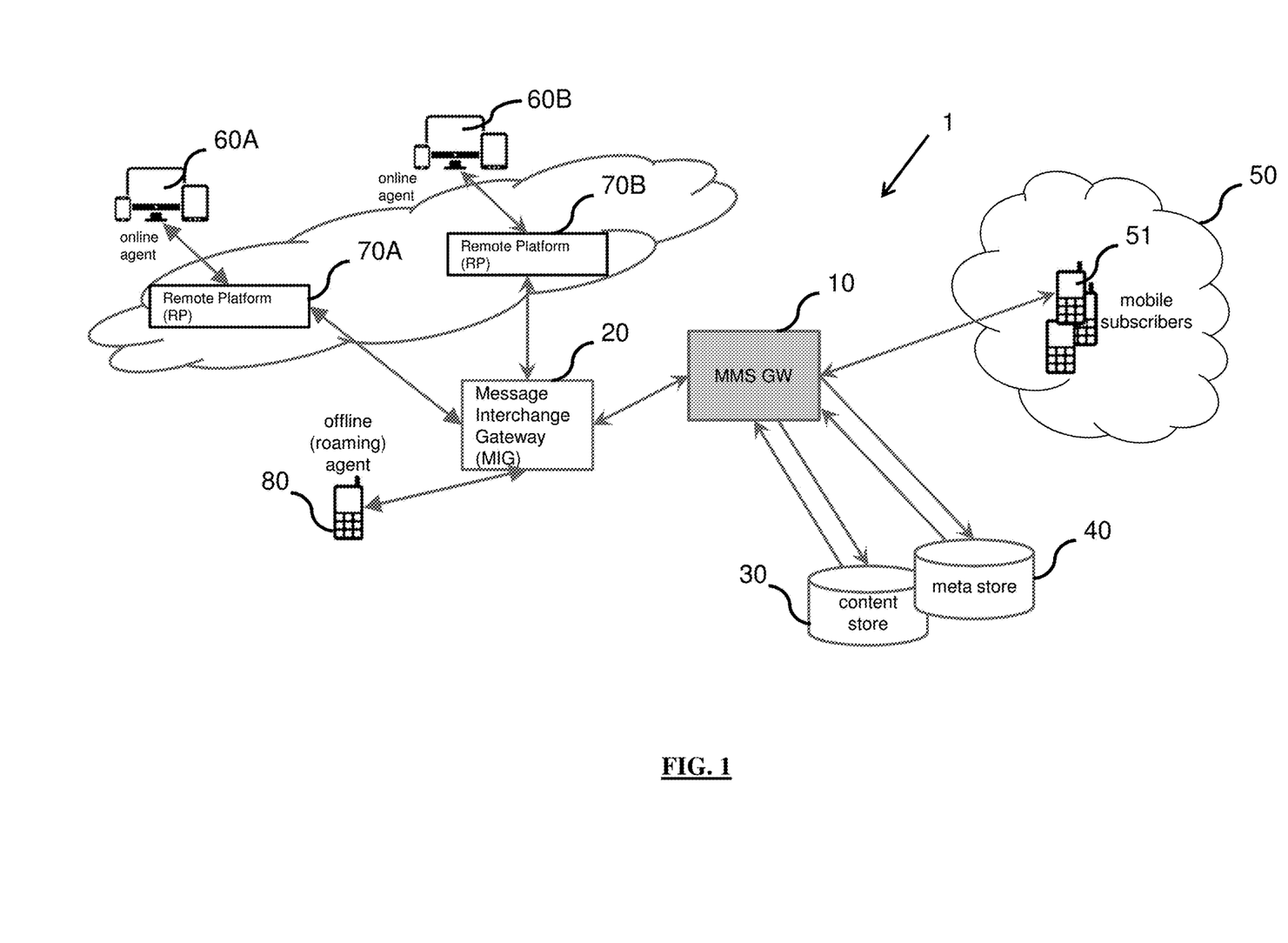
FIG. 1 shows an overview of a messaging system.

FIG. 1 shows an overview of a messaging system 1, and the implementation of a MMSGW 10, in association with a MIG 20. A MIG 20 is a Message Interchange Gateway, as described in patent application PCT/US2016/022607. The MMSGW 10 is shown cooperating with a content store 30 and a meta store 40, both of which are shown, in this example, as external to the MMSGW 10. Said stores may also be implemented internal to the MMSGW as one entity or a plurality of different entities, optionally each specified to store particular forms of data or files. Mobile subscribers 50 send MMS messages from e.g. a handset 51 which are handled by e.g. a carrier (not shown) to which the handset is subscribed. A handset is an example of a mobile device suitable for use with the present invention.

In the example of FIG. 1, the MMSGW 10 is arranged cooperative with a MIG 20 which in turn is associated with different types of users. For example, online agents 60A 60B are connected to the MIG 20 by means of remote platform technology 70A 70B and a computer, and an offline (roaming) agent 80 is connected to the MIG 20 by means of a handset.

Figure 2A:
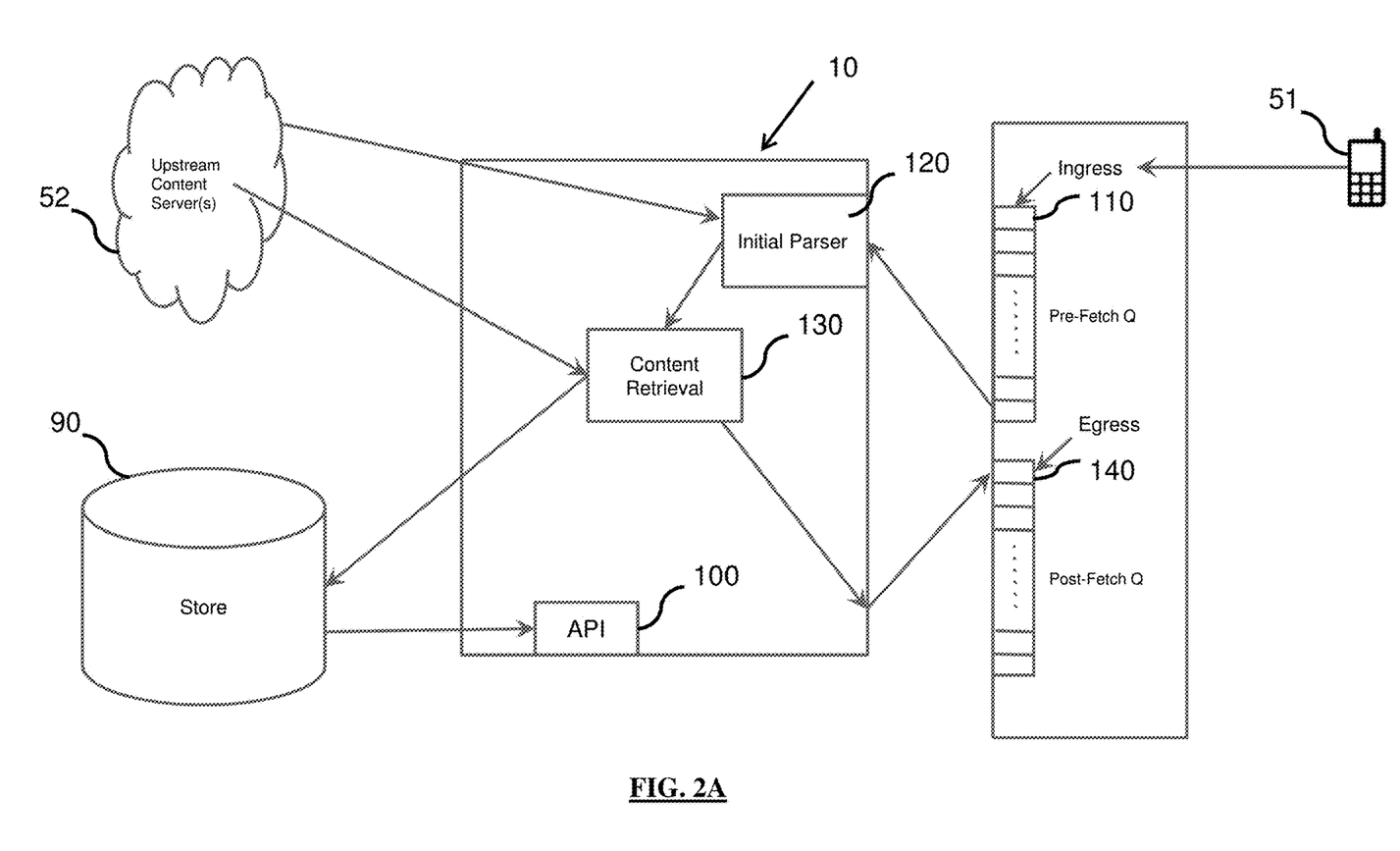
FIG. 2A shows a high level view of a MMSGW according to an embodiment of the present invention.

FIG. 2A shows a high level view of a MMSGW according to an embodiment of the present invention. The Multimedia Messaging Service Gateway system 10 is designed to receive content associated with a MMS message, originally sent from a mobile device such as a handset 51. The message is processed for sending at least partly in association with servers 52, upstream content servers for example, where the carrier or other provider stores the content of the message and the message itself. The MMSGW 10 receives a notification of the sending of the message, achieved by means of a carrier or other provider with which the mobile device is associated. The actual message or associated content may not be provided to the MMSGW, rather, upon notification, the MMSGW is facilitated to retrieve the content and relocate the content to its own store 90. Here the store 90 is shown as comprised in the MMSGW 10. An API 100 comprised in the MMSGW 10 is provided for a third party to be able to retrieve metadata associated with the newly relocated content, file or files, etc.

As shown in FIG. 2A, the MMSGW 10 according to an embodiment of the present invention comprises:

- an ingress 110, for reception of a notification to the MMSGW of sending of the MMS message and for forwarding of the notification to,
- an initial parser 120, arranged in co-operation with the server 52 and arranged to obtain metadata associated with the content, for production of an IP object based on the notification,
- a content retrieval 130 for download of the content from the server according to the IP object,
- a store 90 for storage of the retrieved content and/or metadata associated with the retrieved content,
- an egress 140 arranged to transmit a MMSGW process completion indicator,
- an API 100, arranged to facilitate retrieval of the retrieved content and/or metadata by at least one remote party.

It is envisaged that a notification is received in association with the sending of one MMS message. This should not be considered as limiting, however, as a notification may be arranged associated with multiple messages id desired. Naturally, the MMSGW 10 is capable of receiving information concerning a plurality of MMS messages and comprises a queuing system at ingress and egress in order to administrate and order the incoming information.

Figure 2B:
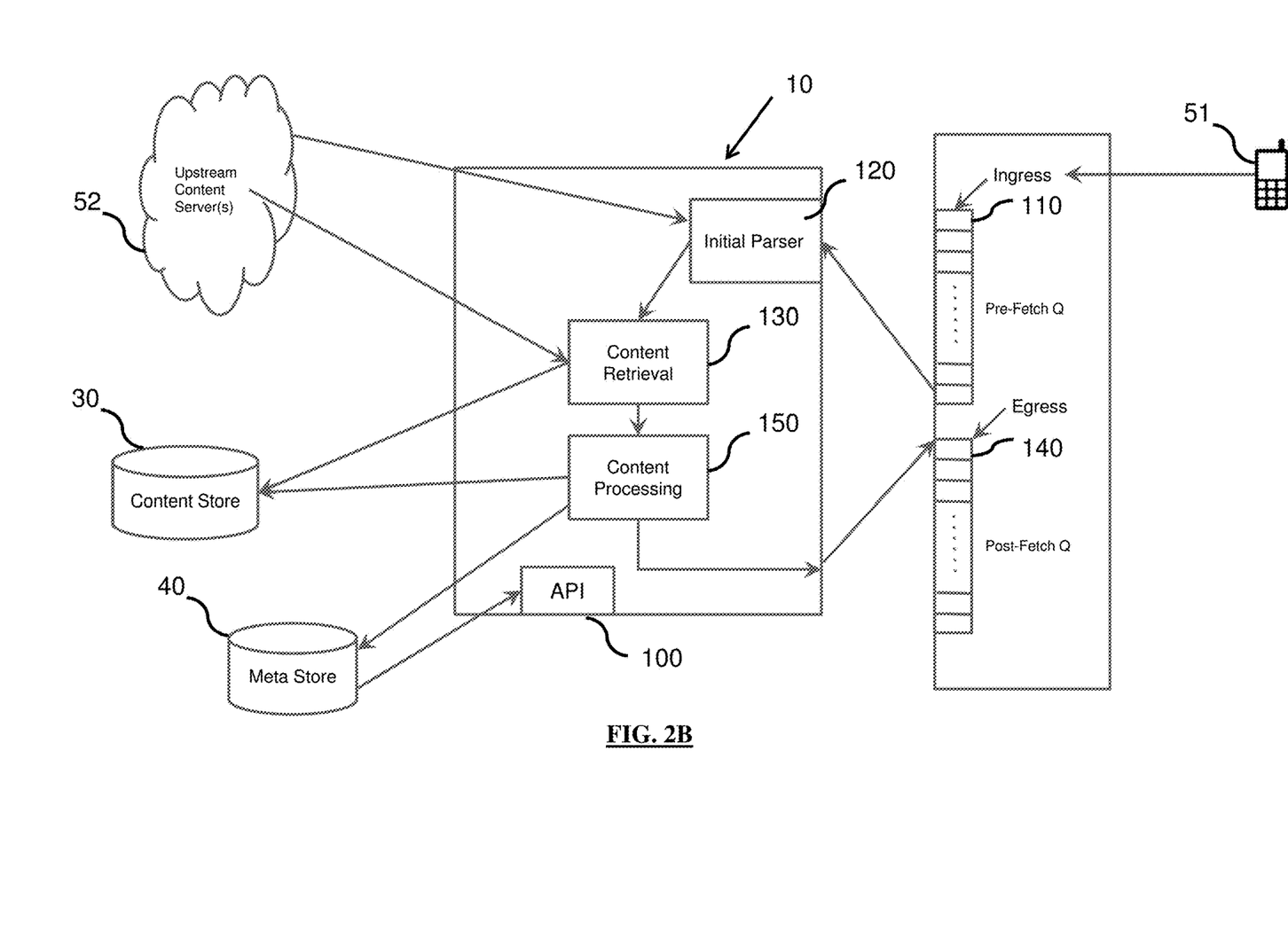
FIG. 2B shows a high level view of a MMSGW according to an embodiment of the present invention.

The action and details of the MMSGW 10 are further discussed below in association with FIG. 2B. FIG. 2B shows an MMSGW 10 according to the present invention, further comprising a content processing 150, the other components as described above also being further detailed in the associated text.

FIG. 2B shows a high level view of the MMSGW according to an embodiment of the present invention. Content is sent from the originating handset to the carrier for that mobile subscriber. A message is submitted, either directly by said carrier, or through a third party, or network of third party service providers, to the MMSGW, using any of a number of possible protocols, including but not limited to HTTP, SMPP, MM4, MM7. This message does not contain the actual multimedia content, but is instead a descriptive file, often in XML, or JSON format, describing the content, or providing an identifier allowing the MMSGW to retrieve said description from the carrier or service provider. This descriptive is, where necessary, retrieved as above, then parsed by the parse Initial Parser (IP). This parsing procedure involves examining the description of the message content, determining what processing of the content, if any, is required, and identifying remote file locations and local storage parameters.

The IP then passes an object (also referred to as an IP object) describing the content, its location, and post-retrieval information to the Content Retrieval (CR) process. The CR downloads the content specified by IP from the remote server, usually that of the carrier or upstream service provider. This retrieval process is most often done using HTTP, but is not limited to this protocol and can use protocols such as FTP, as dictated by the upstream service provider or carrier.

Once the content has been retrieved and stored locally, any post-retrieval processing of said content is carried out by the Content Processing (CP) process, as dictated by the IP. Such processing may, for example, require files (images, videos etc) to be rendered in varying sizes or formats, depending on the consumer platform for which the content is intended. The output from CP is a number of files, stored on the Content Store (CS), and definitions for each component of the message, written to the local Meta Store (MS).

An API component (API) is provided to allow remote parties to retrieve the metadata pertinent to their own messages, so they in turn can download the content form the Content Store (CS). This API queries the MS, and builds an object, typically but not exclusively in JSON format, returning it to the querying party. This object contains information such as the number of parts in the message, the MIME type, size and file name for each component part. The precise content of the object generated will vary depending on the API call used, and the authorisation level of the querying party.

Figure 3:
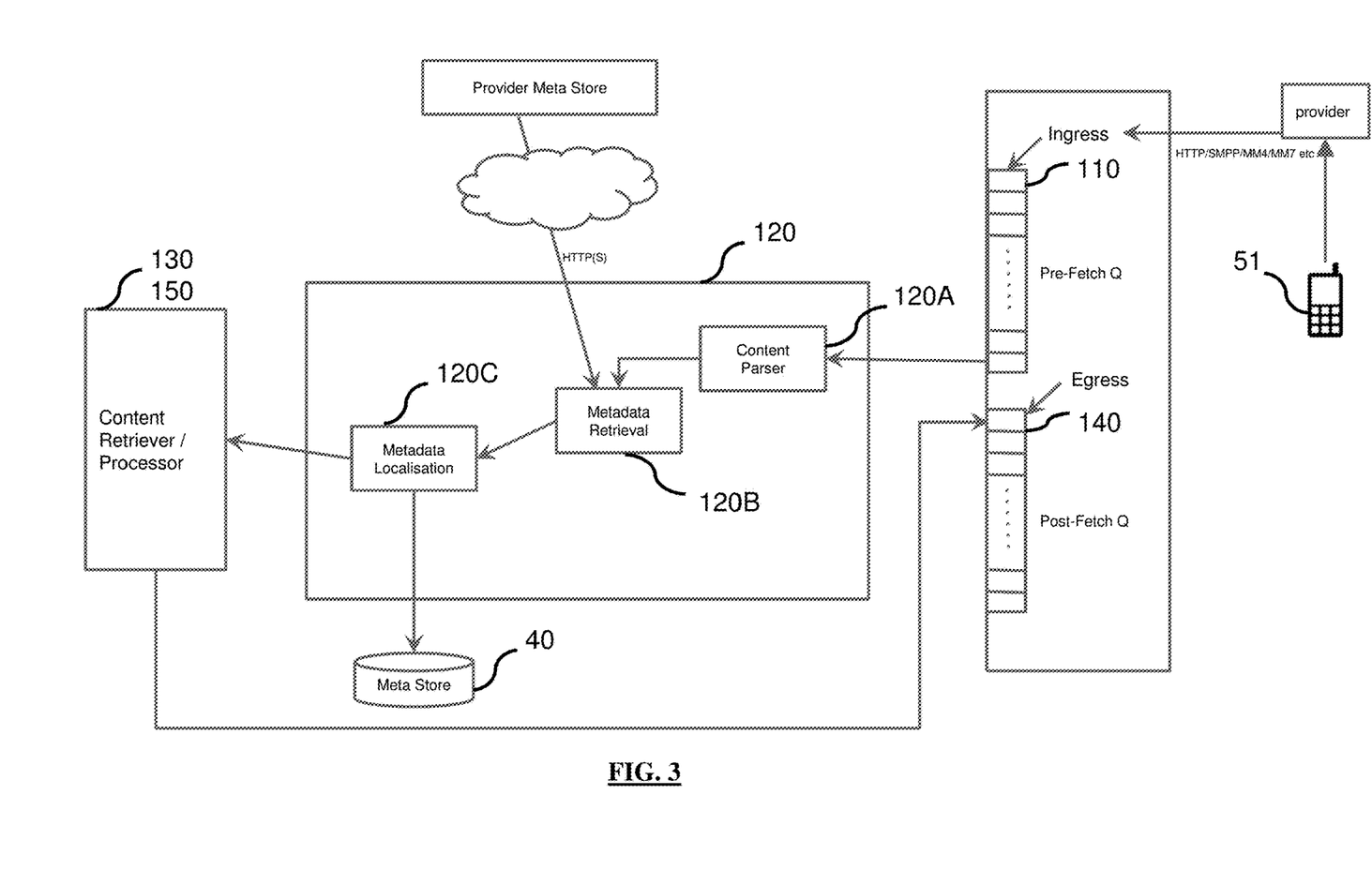
FIG. 3 shows a more detailed view of the initial parser (IP) according to an embodiment of the present invention.

FIG. 3 shows a more detailed view of the IP 120, for each new notification of an inbound MMS message, the IP examines the content of the notification. This is done by the content parser 120A. Depending on the source of the notification (which carrier or upstream provider has sent it into MMSGW) the notification itself may contain the full metadata required to successfully process the MMS content, or it may contain just an identifier, indicating where said metadata can be retrieved from, or indeed a combination or hybrid of the two above scenarios.

In FIG. 3, the IP 120 is shown as further comprising modules and processes: content parser 120A, metadata retrieval 120B, metadata localisation 120C.

Where only an identifier, or partial metadata, is contained in the notification, the next process Metadata Retrieval (MR) 120B, using unique content such as an identifier from within the initial notification, will query, using a protocol such as HTTP, the upstream service provider for the totality of the metadata required to successfully download and relay the MMS message. Said data will typically be retrieved in a data format such as JSON or XML, but may use other representative formats.

Having retrieved the full metadata, Metadata Localisation (ML) 120C is used to determine what content needs to be downloaded, where said content is to be stored, and what post-download processing, if any, is required on this content. Each sub-component of the final message is detailed in the MS 40, and the CR/P 130 150 now starts to download and process, where required, said component parts.

Figure 4:
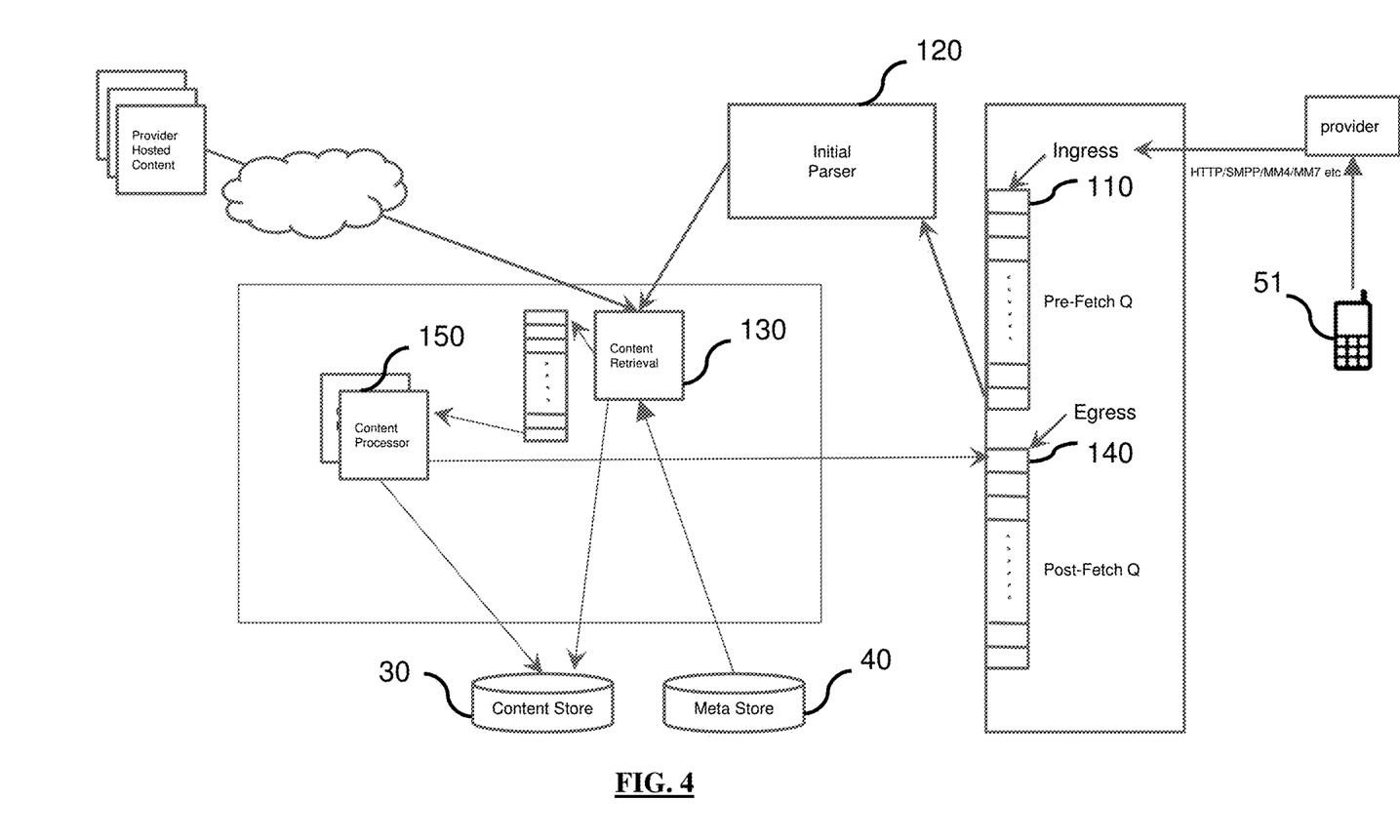
FIG. 4 shows the content handling modules, namely content retrieval (CR) and content processing (CP), according to an embodiment of the present invention.

FIG. 4 shows the content handling modules, namely Content Retrieval (CR) 130 and Content Processing (CP) 150. CR 130 queries the MS 40 for any outstanding download requirements. Any messages, or message components requiring download, are then requested at the address, most typically a HTTP URL, downloaded, and stored at the location, either local or remote, designated by the retrieved metadata. Once all content has been retrieved, the message is queued for processing by the Content Processor (CP) 150.

CP 150 retrieves the localised metadata from MS 40 for this particular message, specifying what, if any, processing is required for each component of the message. This may involve the use of external libraries, including but not limited to the Python Imaging Library (PIL) allowing the processor to alter the size, resolution or format of an image or video, or other functions to truncate or translate text content.

The metadata retrieved from MS 40 by CP 150 resembles a list of jobs, specifying the source item and criteria required in the processed item.

Once the CP 150 has finished processing all components, the message is ready for consumption, either by API 100 request (not shown), or by passing the object (a CP object) to the Egress Queue 140 for handling by an externals component such as MIG 20 (not shown).

Figure 5:
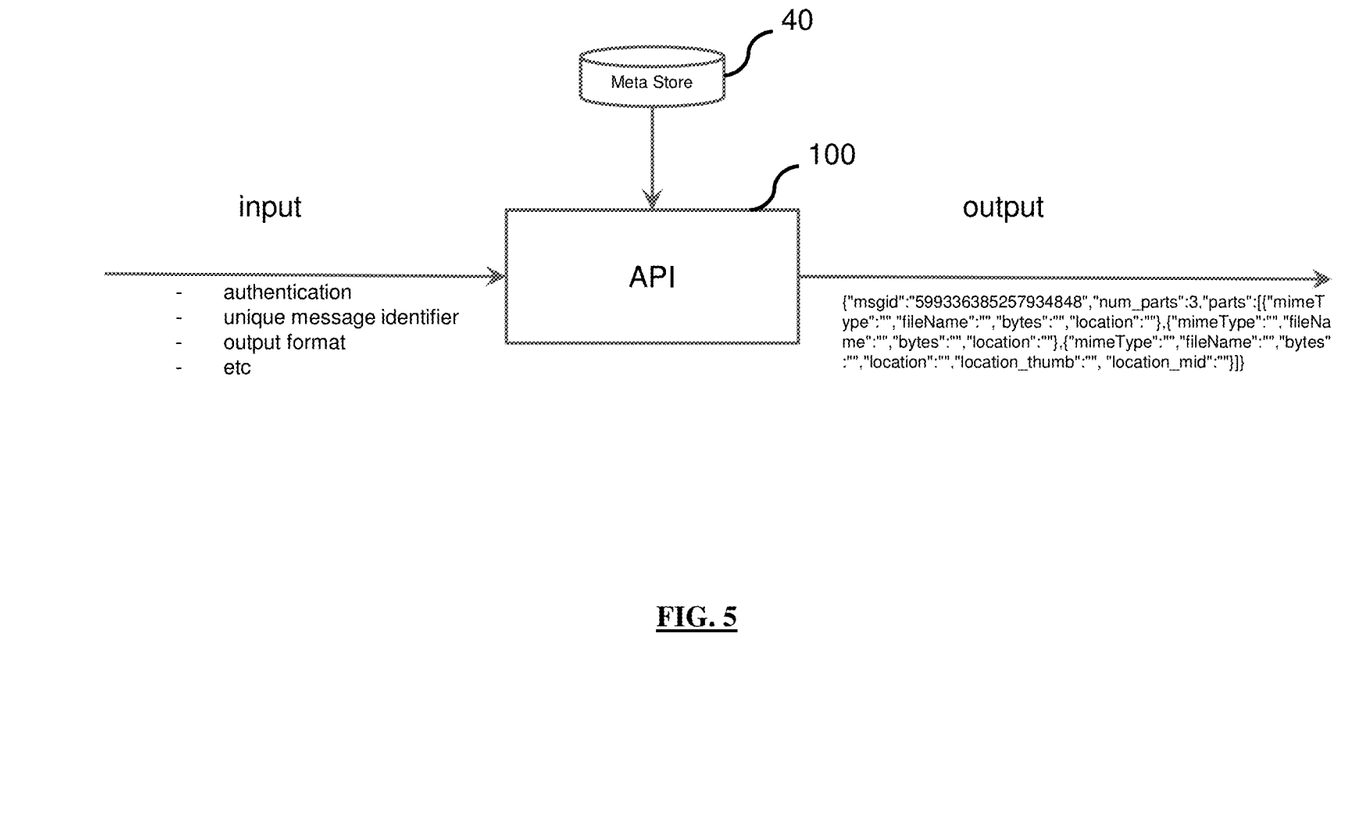
FIG. 5 shows an overview of the API in use according to an embodiment of the present invention.

FIG. 5 shows an overview of the API 100 in use. A client presents a request to the API interface, typically but not necessarily a HTTP(S) request. The request specifies certain mandatory parameters such as authentication tokens/credentials, and the identifier for the message for which metadata is required. The client request can also specify the required format for any output generated by this API request. The default output format is JSON, although XML, HTTP and other formats are supported. Once authentication is complete, the API 100 retrieves the relevant metadata from MS 40, formats the information as required, and outputs the information to the client in response to the request.

Figure 6:
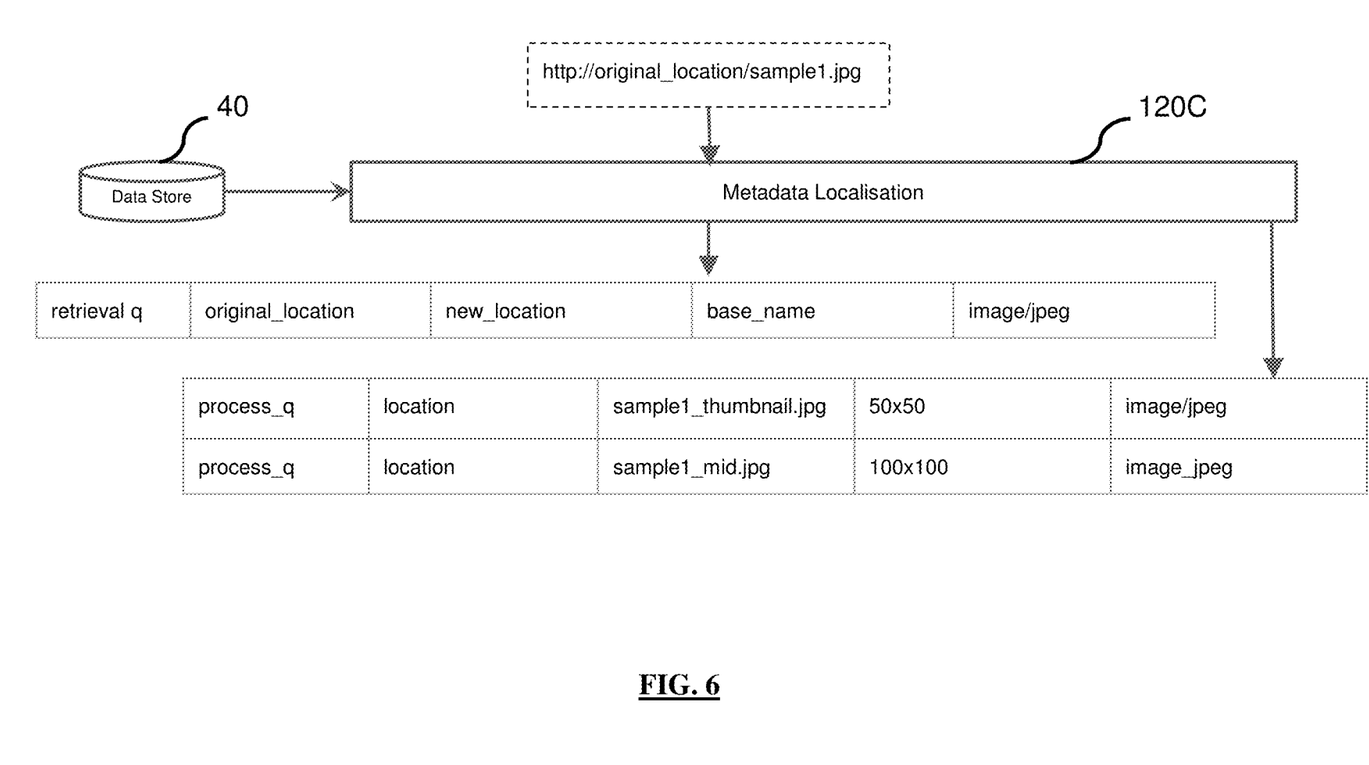
FIG. 6 shows methods employed by the metadata localisation module (ML) according to an embodiment of the present invention.

FIG. 6 shows, in greater detail, the methods employed by the Metadata Localisation (ML) 120C process. For the message as a whole, a unique random string (URID) is generated for use in naming the retrieved items when stored locally. To maintain the integrity of the message, the original base filename for each message component is retained throughout the system, however the items are retrieved using a url path built using this URID in combination with the original filename. Each sub-component in a single MMS message is accessed via this same path. Based on attributes of the original MMS notification, such as caller id (ANI) Dialled number (DNIS), and other identifiers as may be contained therein, ML determines what processing steps are required on the retrieved content, formulating effectively a 'job-list' for the CP later in the process. Using one or more of the identifiers mentioned, ML determines the ultimate target platform for this message, and what specific content requirements this platform has. For example, one platform may require an image size of X pixels wide, whereas another requires images to be presented as Y pixels wide. Rather than inefficiently rendering every possible content size and format, the solution optimises the workload, and only prepares content as will be required by the final consumer.

The decisions on what type of target platform is required, and the criteria for said platform, are retrieved from a data store, either an RDBMS or noSQL structure such as Redis.

Output from the ML can be of 2 forms: metadata intended for the Content Retrieval process, and metadata for the Contact Processing process.

Figure 7:
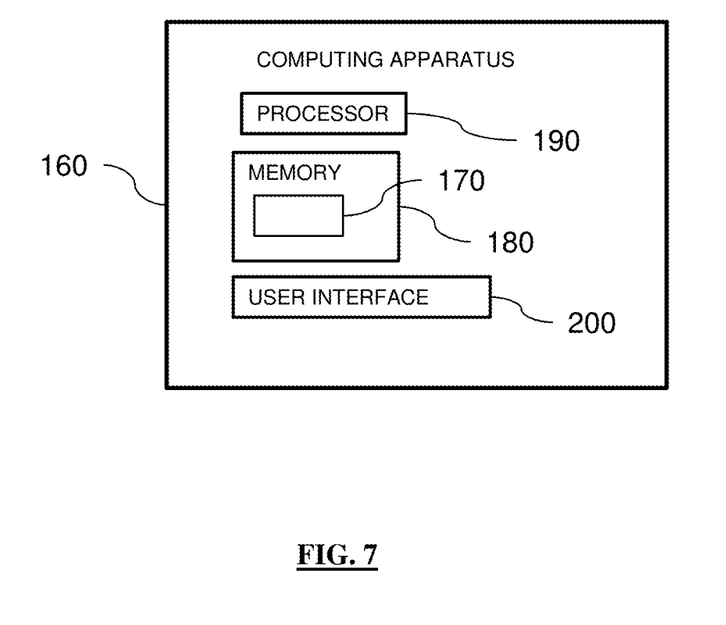
FIG. 7 illustrates an exemplary architecture for a computing device that can be used to practice aspects of the disclosed embodiments.

Referring to FIG. 7, in at least one exemplary aspect, each of the MMSGW 10, MIG 20, remote platforms 70A, 70B, handsets, mobile devices, user devices, servers and other disclosed devices and systems may be implemented using an instance or replica of the computing apparatus 160 or may be combined or distributed among any number of instances or replicas of computing apparatus 160. The user devices can comprise computing devices, mobile communication devices, wireless communication devices, smart phones, navigation equipped or enabled devices, tablets and any other such similar or compatible devices.

The computing apparatus 160 may include computer readable program code 170 stored on at least one non-transitory computer readable medium 180 for carrying out and executing the processes and methods described herein. The computer readable medium 180 may be a memory of the computing apparatus 160. In alternate aspects, the computer readable program code 170 may be stored in a memory external to, or remote from, the apparatus 160. The memory may include magnetic media, semiconductor media, optical media, or any media which is readable and executable by a computer. Computing apparatus 160 may also include a processor 190 for executing the computer readable program code 170 stored on the at least one computer readable medium 180. In at least one aspect, computing apparatus may include one or more input or output devices, generally referred to as a user interface 200, similar to the user interface described above, which may operate to allow input to the computing apparatus 160 or to provide output from the computing apparatus 160, respectively. The user interface 200 may include one or more of a display, touch screen, buttons, audio input device and audio output device. The embodiments of the present invention have been elucidated above in terms of MMS messaging, in cooperation with a mobile device. The use of MMS messaging should not be considered as limiting, as embodiments of the present invention are further susceptible for use in association with other applications, examples of which comprise but are not limited to; Facebook, WhatsApp, WeChat, Twitter, RightNow, Liveperson, Viber.

LIST OF REFERENCE NUMERALS

1 messaging system
10 MMSGW
20 MIG
30 content store
40 meta store
50 mobile subscribers
60 handset
60A 60B online agent
70A 70B remote platform
80 offline (roaming) agent
90 store
100 API
110 ingress
120 initial parser
120A content parser
120B metadata retrieval
120C metadata localisation
130 content retrieval
140 egress
150 content processing
160 computing apparatus
170 computer readable program code
180 computer readable medium
190 processor
200 user interface

The invention claimed is:

1. A Multimedia Messaging Service Gateway (MMSGW) system (10), for the reception of a content associated with a MMS message, the MMS message comprising an actual message and the associated content, the MMS message originating from a mobile device (51) arranged in co-operation with a carrier comprising a server (52), the MMSGW (10) comprising:

at least one processor configured to:
  receive, via an ingress (110), a notification to the MMSGW (10) of sending of the MMS message,
  forward, via the ingress (110), the notification to an initial parser (120),
  obtain, via the initial parser (120) arranged in co-operation with the server, metadata associated with the content, for production of an IP object based on the notification, download, via a content retrieval (130), the content from the server according to the IP object, store in a store (90) of at least one memory one or more of the retrieved content or metadata associated with the retrieved content, transmit, via an egress (140), a MMSGW process completion indicator, facilitate, via an API (100), retrieval of one or more of the retrieved content or the metadata by at least one remote party.

2. A Multimedia Messaging Service Gateway (MMSGW) system, as claimed in claim 1, wherein the mobile device comprises one of: a handset (51); a mobile phone; a computer terminal.

3. A Multimedia Messaging Service Gateway (MMSGW) system, as claimed in claim 1, wherein:

the notification comprises one or more of the following characteristics:

the notification originates from one of: the carrier, a third party or network, a third party service provider; or the notification comprises a protocol; or the notification comprises a descriptive file describing the content; or the notification comprises an identifier; or the notification comprises metadata associated with the content.

4. A Multimedia Messaging Service Gateway (MMSGW) system, as claimed in claim 1, wherein the content comprises at least one file.

5. A Multimedia Messaging Service Gateway (MMSGW) system, as claimed in claim 1, wherein the at least one processor is further configured to, via the initial parser (120), retrieve the metadata or localize the metadata.

6. A Multimedia Messaging Service Gateway (MMSGW) system, as claimed in claim 1, wherein the store (90) of the at least one memory comprises one or more of a content store (30) or a meta store (40), arranged internal to the MMSGW (10).

7. A Multimedia Messaging Service Gateway (MMSGW) system, as claimed in claim 1, wherein the at least one processor is configured to utilize at least one of:

a pre-fetch queue with the ingress (110); or a post-fetch queue with the egress (140).

8. A Multimedia Messaging Service Gateway (MMSGW) system, as claimed in claim 1, wherein the server (52) comprises a plurality of servers.

9. A Multimedia Messaging Service Gateway (MMSGW) system, as claimed in claim 1, wherein the MMSGW further comprises a content processor (150) configured to post-retrieval processing-ef the content to produce a content processor (CP) output, and is arranged in co-operation with the at least one processor configured to utilize the content retrieval (130) and the egress (140).

10. A Multimedia Messaging Service Gateway (MMSGW) system, as claimed in claim 9, the content processor (150) being further arranged in co-operation with the store (90) of the at least one memory such that the store (90) is further configured to store the CP output from the content processing (150).

11. A Multimedia Messaging Service Gateway (MMSGW) system, as claimed in claim 9, wherein the CP output from the content processor (150) comprises at least one file associated with the content.

12. A Multimedia Messaging Service Gateway (MMSGW) system, as claimed in claim 1, wherein the API (100) is arranged to provide the at least one remote party with an API output.

13. A method of operating a Multimedia Messaging Service Gateway (MMSGW) system, the MMSGW arranged for the reception of a content associated with a MMS message, the MMS message comprising an actual message and the associated content, the MMS message originating from a mobile device arranged in co-operation with a carrier comprising a server, the method comprising:

receiving, via an ingress (110), a notification to the MMSGW (10) of sending of the MMS message, forwarding, via the ingress (110), of the notification to an initial parser (120), obtaining, via the initial parser (120) arranged in co-operation with the server, metadata associated with the content, for production of an IP object based on the notification, downloading, via a content retrieval (130), the content from the server according to the IP object, storing, with a store (90), one or more of the retrieved content or metadata associated with the retrieved content, transmitting, via an egress (140), a MMSGW process completion indicator, facilitating, via an API (100), retrieval of one or more of the retrieved content or the metadata by at least one remote party.

14. A method of operating a MMSGW system, as claimed in claim 13, comprising at least one of the following:

the mobile device (51) comprises one of: a handset; a mobile phone; a computer terminal;

the notification originates from one of: the carrier, a third party or network, a third party service provider;

the notification comprises a protocol;

the notification comprises a descriptive file describing the content;

the notification comprises an identifier;

the notification comprises metadata associated with the content;

the content comprises at least one file;

the method further comprises, via the initial parser (120), one or more of retrieving the metadata or localizing the metadata;

the store (90) comprises one or more of a content store (30) or a meta store (40), arranged internal to the MMSGW (10);

the ingress (110) comprises a pre-fetch queue or the egress (140) comprises a post-fetch queue; or the server (52) to comprise a plurality of servers.

15. A method of operating a MMSGW system, as claimed in claim 13, wherein:

the method further comprises the step of:

post-retrieval processing, via a content processor (150), of the content to produce a content processor (CP) output, wherein the content processor (150) is arranged in co-operation with the content retrieval (130) and the egress (140); or the CP output from the content processor (150) comprises at least one file associated with the content.

16. A method of operating a MMSGW system, as claimed in claim 13, comprising the further step of providing, via the API (100), the at least one remote party with an API output.

17. A non-transitory computer-readable medium having instructions stored thereon that, when executed by a computer, cause the computer to perform the method as claimed in claim 13.

18. A Multimedia Messaging Service Gateway (MMSGW) system, as claimed in claim 3, wherein:
the notification comprises an HTTP, SMPP, MM4 or MM7 protocol; or
the notification comprises a descriptive file describing the content in XML or JSON format; or
the notification comprises an identifier arranged to facilitate obtaining a description of the content.

19. A Multimedia Messaging Service Gateway (MMSGW) system, as claimed in claim 4, wherein the at least one file comprises an image, a video, or a sound file.

20. A Multimedia Messaging Service Gateway (MMSGW) system, as claimed in claim 6, wherein the retrieved content or metadata are stored in a database or a plurality of databases.

21. A Multimedia Messaging Service Gateway (MMSGW) system, as claimed in claim 11, wherein the at least one file associated with the content is arranged in a desired format.

22. A Multimedia Messaging Service Gateway (MMSGW) system, as claimed in claim 11, wherein metadata is associated with the at least one file.

23. A Multimedia Messaging Service Gateway (MMSGW) system, as claimed in claim 12, wherein the API comprises one or more of a JSON format, a number of parts of the message, a MIME type, a size, or a file name of a message component.

24. A method of operating a MMSGW system, as claimed in claim 14, comprising at least one of the following:
the notification comprises an HTTP, SMPP, MM4 or MM7 protocol;
the notification comprises a descriptive file describing the content in XML JSON format;
the notification comprises an identifier arranged to facilitate obtaining a description of the content;
the content comprises at least one image, video, or sound file; or
the retrieved content or metadata are stored in a database or a plurality of databases in the one or more of the content store (30) or the meta store (40), the one or more of the content store (30) or the meta store (40) being implemented as at least one memory.

25. A method of operating a MMSGW system, as claimed in claim 15, wherein the content processor (150) is arranged in co-operation with the store (90) such that the store (90) stores the CP output from the content processor (150).

26. A method of operating a MMSGW system, as claimed in claim 15, wherein the at least one file associated with the content is arranged in a desired format.

27. A method of operating a MMSGW system, as claimed in claim 15, wherein the CP output from the content processor (150) comprises metadata associated with the at least one file.

28. A method of operating a MMSGW system, as claimed in claim 16, wherein the API (100) comprises at least one of a JSON format, a number of parts of the message, a MIME type, a size, or a file name of a message component.

* * * * *

UNITED STATES PATENT AND TRADEMARK OFFICE
CERTIFICATE OF CORRECTION

PATENT NO. : 10,476,979 B2
APPLICATION NO. : 15/183261
DATED : November 12, 2019
INVENTOR(S) : Anthony Cahill et al.

Page 1 of 1

It is certified that error appears in the above-identified patent and that said Letters Patent is hereby corrected as shown below:

In the Specification

At Line 32 of Column 8, please remove "60" and replace it with "51"

In the Claims

At Line 53 of Column 9, please remove "-ef" after "processing" and before "the"

At Line 14 of Column 10, please remove "of" after "," and before "the"

Signed and Sealed this
Eighteenth Day of February, 2020

Andrei Iancu
*Director of the United States Patent and Trademark Office*